April 27, 1954   F. J. GALLOWAY   2,676,689
PARKING METER
Filed Oct. 19, 1950   2 Sheets-Sheet 1

INVENTOR
Frederick J. Galloway
BY
Pennie, Edmonds, Morton, Barrows & Taylor
ATTORNEYS April 27, 1954  F. J. GALLOWAY  2,676,689
PARKING METER
Filed Oct. 19, 1950  2 Sheets-Sheet 2
FIG. 7
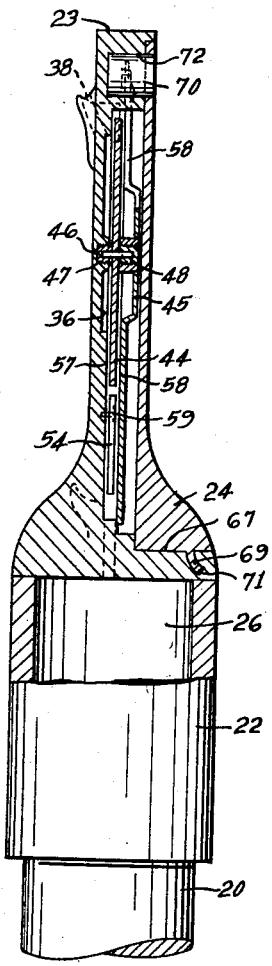
FIG. 8
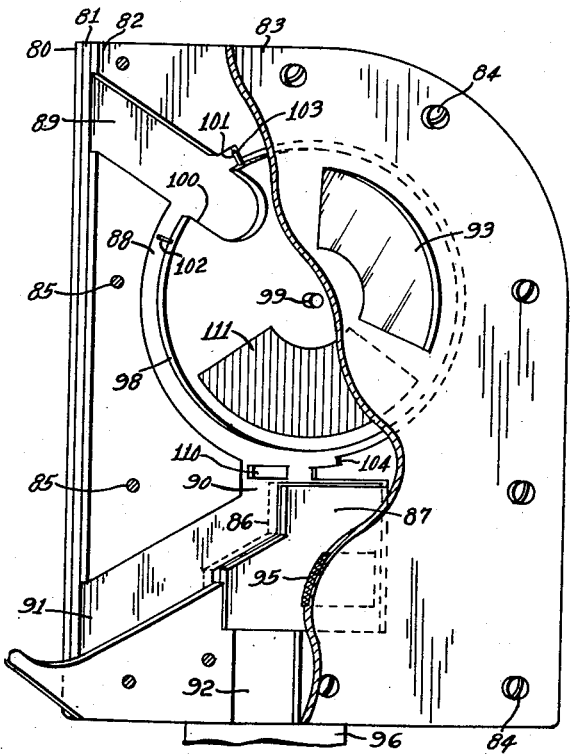
FIG. 9
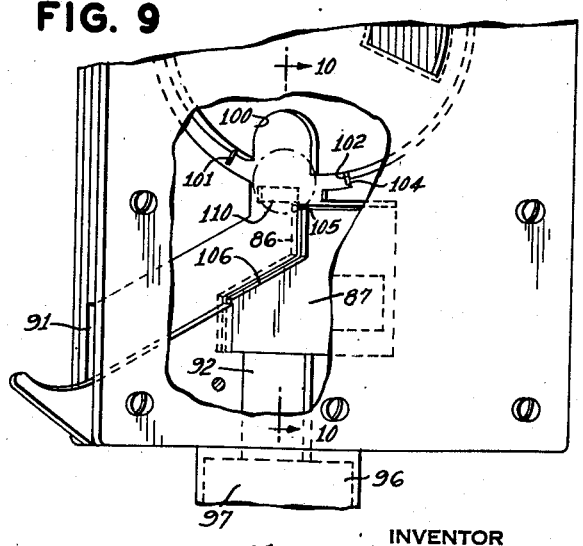
FIG. 11  FIG. 10
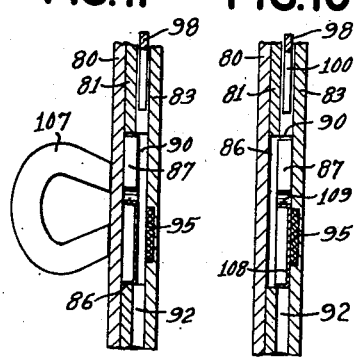
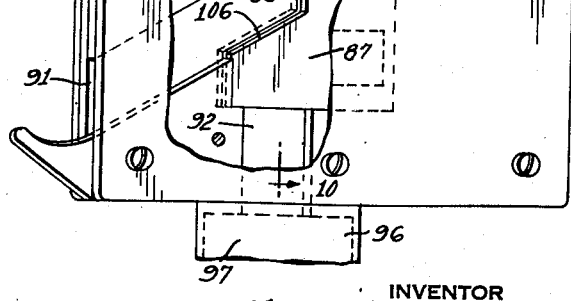
INVENTOR
*Frederick J. Galloway*
BY
*Pennie, Edmonds, Morton, Barrows, & Taylor*
ATTORNEYS Patented Apr. 27, 1954

2,676,689

UNITED STATES PATENT OFFICE 2,676,689

PARKING METER

Frederick J. Galloway, Clifton, N. J.

Application October 19, 1950, Serial No. 191,053

10 Claims. (Cl. 194—94)

This invention relates to coin operated parking meters and particularly to meters adapted to indicate visually when a coin of proper demonination has been inserted therein.

In recent years municipal authorities have adopted parking meters as a means for controlling parking of automobiles in congested areas. To meet the requirements of various localities parking meters have been developed which will measure the passage of any length of time from a few minutes to all day. Such parking meters measure the time by means of a clock mechanism. The clock mechanism forms a large part of the initial cost of the meter and in addition adds greatly to its cost of maintenance. The cost of procuring and maintaining a clock-work parking meter makes its use under certain conditions prohibitively expensive, for example, where it is desired to provide metered all-day parking at a reasonable fee.

The object of my invention is to provide a device having no clock mechanism for use as a parking meter which will be low in cost, reliable in operation, flexible in application and require a minimum of maintenance.

My device comprises an outer casing adapted to house the meter mechanism and having a coin insertion chute and a rejected-coin discharge chute. Also within the casing is a means for identifying coins inserted into the casing so that coins of incorrect denomination are rejected from the device through the coin rejection chute and coins of the denomination for which the device is adjusted are retained therein. Means are provided for delivering coins inserted into the casing from the coin insertion chute to the coin rejecting and retaining means. Normally this means takes the form of a rotatable coin carrier having a coin receiver in the form of a recess at its outer periphery. The coin carrier is mounted on a pivot and is counterbalanced so that when the coin receiver is empty, the coin carrier is rotated into its coin receiving position opposite the coin insertion chute, and when the coin carrier has a coin in the receiver the carrier rotates into its coin discharge position opposite the coin rejecting and retaining means. Indicator means visually indicate when an acceptable coin has been retained within the device by the coin retainer. A means for releasing acceptable coins retained by the coin retainer is provided whereby, when a coin is released, the coin carrier will return to its normal coin receiving position and the indicator will indicate that the coin is no longer retained by the coin retainer. A coin receptacle is provided within the casing to receive acceptable coins released from the coin retainer and access to this receptacle may be had by unlocking the casing.

For a more detailed description of my invention reference may be had to the drawings, in which Figs. 1, 2 and 3 are front, side and back elevations respectively of an advantageous embodiment of the invention;

Fig. 7 is a sectional view taken on line 7—7 of Fig. 4;

Fig. 8 is a front view of another embodiment of the invention with the front plate broken away;

Fig. 9 is a fragmentary view of the coin retainer structure of the apparatus of Fig. 8;

Fig. 10 is a sectional view taken on line 10—10 of Fig. 9 showing the coin retainer in position to retain coins of the correct denomination; and Fig. 11 is a sectional view similar to Fig. 10 showing the coin retainer in position to allow coins to fall into the coin receptacle.

Figure 1:
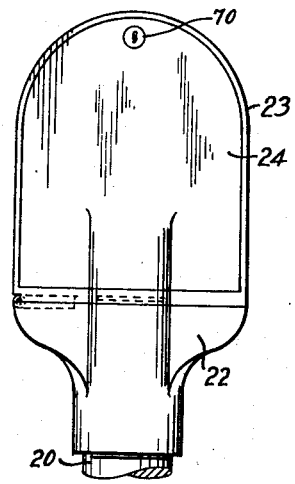
Figure 2:
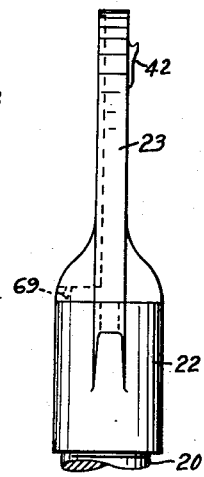
Figure 3:
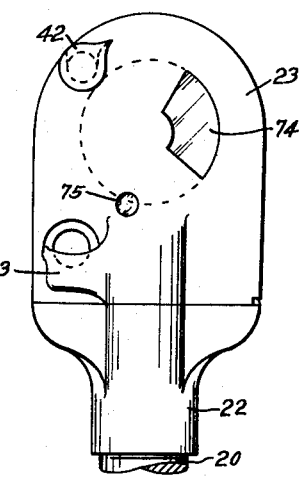

In the embodiment of the invention illustrated in Figs. 1 to 7 the device is mounted on a support 20 threaded at its upper end 21. The casing of the device comprises a base member 22, a back plate 23 and a front plate 24. The base member 22 is formed with a threaded recess 25 to receive the threaded end 21 of the support 20 and with a coin receptacle recess 26. The back plate 23 is hingeably mounted on the base member 22 by a hinge 27, and screws. The back plate 23 swings on the hinge 27 upwards to expose the coin receptacle 26, and downwards to close off the coin receptacle 26. A lock 28 is provided to lock the back plate 22 in its closed position. The barrel of the lock 28 fits in a recess 29 in the base member 22 and rotatable lock lugs 30 are received in a back plate lock lug recess 31. The base member 22 is screwed onto the support 20 and is locked in position by a locking pin 32. The locking pin 32 has a shank 33 of cross-shaped cross-section and a circular head 34. After the meter is screwed onto the support 20, the lock 28 is rotated to its unlocked position (at which the back plate lock lugs 30 are disengaged from the lock lug recess 31) and the back plate 23 swung upwards on hinge 27 to expose the coin receptacle 26. Locking pin 32 is inserted into a locking pin recess 35 at the bottom of the coin receptacle 26 so that the circular locking pin head 34 is received in the circular recess 35 and the shank 33 is received in a correspondingly cross-shaped hole 35a in the base member 22 and also in a corresponding recess in the upper end of the support 20. When the locking pin 32 is so engaged with both the support 20 and the base member 22, the meter cannot be rotated relative to the pipe and unscrewed therefrom. The back plate 23 is then swung downwards to close the coin receptacle 26 and to conceal the locking pin 32.

The back plate 23 forms the main structural support for the working parts of my device. A coin carrier recess 36 (Figs. 4 and 7) is formed in the back plate 23 on its inner surface. A coin insertion chute 38 and a coin discharge passage 39 communicate with the coin carrier recess 36. A coin rejection chute 40 and a coin receptacle chute 41 communicate with the coin discharge passage 39. The exterior opening of the coin insertion chute 38 has a slot hood 42 and the exterior opening of the coin rejection chute 40 has a coin stop lip 43 formed on the outside of the back plate 23. The coin insertion chute 38 is dimensioned so that a coin of predetermined size (and all smaller coins) may be inserted therein but coins larger than those of acceptable size are excluded therefrom. Thus, by making the coin insertion chute 38 the correct size, the device may be made to accept only dimes, or no coins larger than a quarter dollar, and so forth.

A rotatable coin carrier 44 is mounted within the coin carrier recess 36 between the back plate 23 and a bearing bracket plate 45 on a shaft 46 which rotates in a bearing 47 in the back plate 23 and a bearing 48 in the bearing bracket 45. The coin carrier 44 is a circular plate of metal substantially the thickness of a coin and has a coin receiving recess portion 49 at its periphery. The recess 49, hereinafter called the "coin receiver," affects the balance of the coin carrier 44 so that it normally tends to rotate on its pivot to bring the coin receiver 49 to its uppermost position. However, when a coin is received in the coin receiver 49 the weight of the coin overbalances the coin carrier 44 and causes it to rotate to bring the coin receiver 49 to its lowermost position. The coin carrier 44 has secured to its outer periphery, adjacent the coin receiver 49, an upper stop pin 50 and a lower stop pin 51. A stop screw 52 is secured to the inner surface of the back plate 23 above the inner opening of the coin insertion chute 38. The stop screw 52 intercepts the upper stop pin 50 and stops the upward rotation of the coin carrier 44 when the coin receiver 49 is opposite the coin insertion chute 38 and is in position to receive a coin therefrom. A stop lug 53 intercepts lower stop pin 51 and stops the rotation of the coin carrier 44 when the coin receiver 49 is opposite the coin discharge passage 39 in position to discharge a coin thereto.

The bearing bracket 45 (shown partly broken away in Fig. 4) is secured by screws 55 to a bracket support ledge 56 which is formed on the inner surface of the back plate 23. The bearings 47 and 48 must be axially aligned so that the coin carrier 44 may rotate freely and without binding from its coin receiving position to its coin discharge position and back again. Therefore, the holes in the bearing bracket 45 through which screws 55 pass are slightly larger than the shanks of the screws 55 so that the bearing bracket 45 may be moved slightly, relative to the back plate 23, to exactly align the bearings 47 and 48.

Coin guides are provided along the path of travel of the coin receiver 49 in order to hold coins in the coin receiver 49 while the coin is being delivered by the coin carrier 44 from the coin insertion chute 38 to the coin discharge passage 39. A back plate coin guide 57 is formed on the inner surface of the back plate 23 in back of the coin carrier 44. It is a segmental annular surface located adjacent the periphery of the coin carrier 44 along the path of travel of the coin receiver 49. A corresponding bearing bracket coin guide 58 is formed on the bearing bracket 45 in front of the coin carrier 44 along the path of travel of the coin receiver 49. The back plate coin guide 57 and the bearing bracket coin guide 58 must be in close proximity to the coin carrier 44 in order to prevent coins received in the coin receiver 49 from falling or tilting sideways while being delivered to the coin discharge passage 39, but actual contact with the coin carrier should be avoided in order to minimize friction. The coin carrier recess 36 and the bearing bracket 45 have no coin guide function, except along the path of travel of the coin receiver 49, and therefore there should be an appreciable air space between the surface of the coin carrier recess 36, the surface of the bearing bracket 45 immediately surrounding the bearing 48, and the corresponding surfaces of the coin carrier 44. The bearing support ledge 56 is formed so that its inner edge is concentric with and of slightly greater diameter than the periphery of the coin carrier 44. Coins received in the coin receiver 49 are held in the coin receiver by this coin guide edge until the coin is delivered to the coin discharge passage 39.

Figure 4:
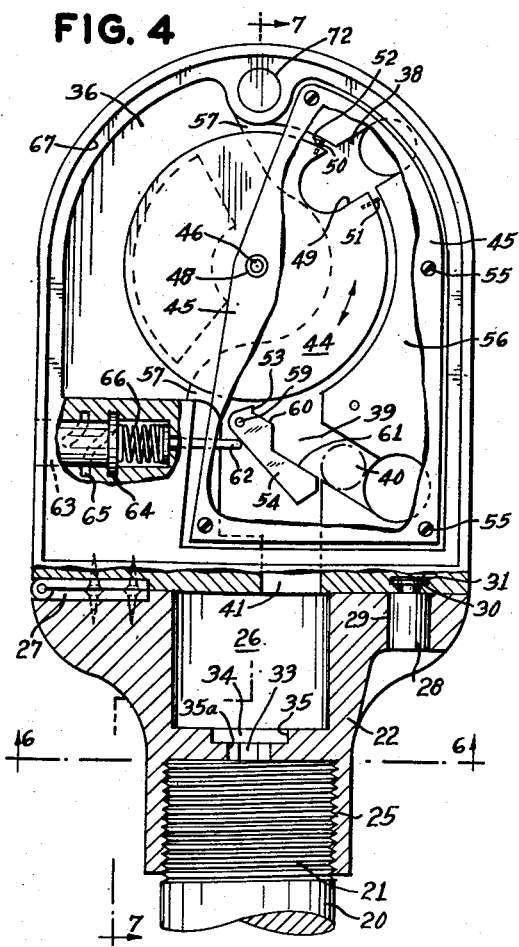
Fig. 4 is a front view of the device of Fig. 1, with the front plate removed and parts broken away.
Figure 6:
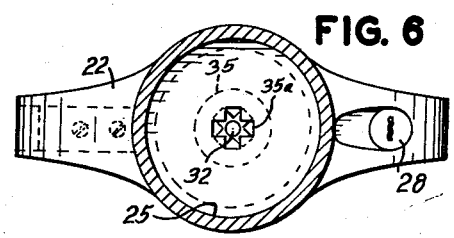
Fig. 6 is a sectional view taken on line 6—6 of Fig. 4.
Figure 5:
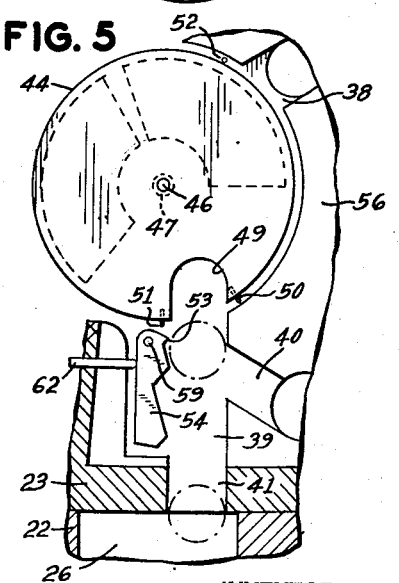
Fig. 5 is a fragmentary front view similar to Fig. 4 showing the coin retainer in released position.

A coin retainer 54 serves to identify coins delivered to the coin discharge passage 39 by the coin carrier 44 so that coins of the correct size may be retained within the device and coins of incorrect size may be rejected therefrom. The coin retainer 54 is pivoted within the coin discharge passage 39 on a retainer pivot 59 and is movable about the pivot between inner and outer limits of travel. A coin retaining lip 60 is formed on the coin retainer 58. When the coin retainer 58 is moved to its inner position (as shown in Fig. 4) the coin retaining lip 60 partially obstructs the coin discharge passage 39. Coins larger in size than the unobstructed portion of the discharge passage between the coin retaining lip 60 and the opposite wall of the discharge passage are unable to pass therethrough and so are prevented from dropping from the coin receiver 49. Coins smaller in size than this unobstructed portion of the coin discharge passage 39 will pass by the coin retaining lip 60 and fall onto a rejected coin guide portion 61 of coin retainer 58, whence the coin will roll through the coin rejection chute 40 to the coin stop lip 43. When the coin retainer 58 is moved to its outer position (as shown in Fig. 5), the coin retaining lip 60 and the rejected coin guide portion 61 are rotated so that the coin discharge passage 39 is substantially unobstructed and any coin held in the coin receiver 49 by the coin retaining lip 60 will be released and allowed to drop by the coin retainer 54 into the coin receptacle 26.

The coin retainer 54 is movable from its coin retaining position (Fig. 4) to its coin releasing position (Fig. 5) by means of a reset plunger 62 and a reset plunger lock 63. When a key is inserted into the reset plunger lock 63 and the key rotated, lock lugs 64 are rotated and caused to travel in a helical path by lock lug grooves 65. The reset plunger 62 is secured to the plunger lock 63. When the plunger lock lugs 64 are screwed outwards by rotating the plunger lock key, the reset plunger 62 also moves outwards allowing the coin retainer 54 to rotate on retainer pivot 59 to its coin releasing position. When the plunger lock lugs 64 are screwed inwards by rotating the plunger lock key in the opposite direction the coin retainer 54 is caused to move inwards to its coin retaining position. A take-up spring 66 is provided to take up any play between the reset plunger and the lock itself.

The front plate 24 is received in a front plate recess 67 formed in the back plate 23, and is secured to the back plate by a front plate hinge lug 69 and by a front plate lock 70. The hinge lug 69 is fitted into a hinge lug recess 71 and when the front plate 24 is received in the front plate recess 67 the barrel of the front plate lock 70 fits into a front plate lock recess 72 formed in the back plate 23.

In order to indicate whether a coin of the correct denomination has been inserted into the meter, means for visually indicating the rotational position of the coin carrier 44 is provided and comprises a transparent window 74 mounted in the back plate 23 in position to permit viewing of the coin carrier 44 within the casing. The surface of the coin carrier 44 facing the back plate 23 is marked with paint, or the like, so that a distinctive mark appears at the indicator window 74 when it is rotated either to its coin discharge position or to its coin receiving position. When a coin is inserted into the device the weight of the coin will cause the coin carrier 44 to rotate to its coin discharge position and a distinctive mark (say a white color) will appear at the window 74. If the coin is of the proper denomination (that is, too large to pass through the portion of the coin discharge passage 39 left unobstructed by the coin retainer 54) it will be retained in the coin receiver 49 by the coin retaining lip 60 and the coin carrier 44 will be held in coin discharge position until the coin is released therefrom by rotation of the plunger lock 63. If the coin inserted into the device is of incorrect denomination (that is, small enough to pass through the unobstructed portion of the coin discharge passage) it will not be retained by the coin retaining lip 60 but will drop onto the rejected coin guide portion 61, and roll through the coin rejection chute 40 to the rejected coin stop lip 43. The coin carrier 44, being thus freed from the weight of the coin in the coin receiver 49, will rotate again to its coin receiving position and the device will visually indicate this fact by the appearance of an appropriate mark (say a red color) at the indicator window 74.

In order to permit a patrolman to detect the use of slugs (in lieu of coins), a coin view window 75 is provided in the back plate 23. This window is positioned opposite the coin retainer 54 so that when the coin carrier 44 is in coin discharge position the window permits inspection of a coin which is retained there.

The manner in which the device operates is as follows: A coin is inserted into the device through the coin insertion chute 38. Only coins up to a predetermined size may be inserted into the chute. The coin travels through the chute 38 to the rotatable coin carrier 44 where it is received in the coin receiver 49. The weight of the coin causes the coin carrier 44 to rotate to its coin discharge position opposite the coin discharge passage 39. The coin retainer 54 which is positioned in the coin discharge passage 39 adjacent the coin carrier recess 36, partially obstructs said discharge passage. Coins smaller in size than the unobstructed portion of the discharge passage 39 will pass by the coin retaining lip 60 and out of the device through the coin rejection chute 40, and the coin carrier 44, freed from the weight of the coin, will rotate to its normal, coin receiving, position. Coins larger in size than the unobstructed portion of the coin discharge passage 39 will be held in the coin receiver 49 by the coin retaining lip 60 of the coin retainer 54 and the coin carrier 44 will be held in its coin discharge position. Coins of the correct denomination or size will be held in the coin receiver 49 by the coin retaining lip 60 until the device is manually reset by an attendant or patrolman who is equipped with a key to the plunger lock 63.

The device is reset by inserting a key into the reset plunger lock 63 and rotating the key and lock. The plunger lock lugs 64 rotate and are screwed outwards causing the lock 63 and the reset plunger 62 to move outwards together. As the reset plunger 62 moves outwards the coin retainer 54 rotates downwards about its pivot 59 and the coin retaining lip 60 and the rejected coin guide 61 are rotated to leave the coin discharge passage 39 substantially unobstructed. The coin then will fall through the coin discharge passage 39 into the coin receptacle 26. The coin carrier 44 will now return to its coin receiving position opposite the coin insertion chute 38. The key and plunger lock 63 are then rotated in the opposite direction causing the lock 63 and reset plunger 62 to move inward together. The coin retainer 54 is rotated upward to its coin retaining position and the device is ready to receive another coin.

Figs. 8 to 11 illustrate another embodiment of my invention. The principal structural differences between this embodiment and the one first described resides in the form and mode of operation of the coin retaining and rejecting means. In the indicating device hereinafter described the coin retaining and rejecting means and the means for resetting the same are magnetically operated and consequently the casing must be fabricated of non-magnetic material.

As shown in Fig. 8 the casing is a built up structure of non-magnetic material comprising a back plate 80, a spacer plate 81, a working parts plate 82 and a front plate 83. These four plates are fastened together by screws 84 received in holes 85 in the front plate 83, working parts plate 82 and spacer plate 81 and in corresponding threaded holes in back plate 80. The spacer plate 81 has a coin carrier bearing centrally positioned therein and a coin retainer recess 86 adapted to receive a coin retainer 87. The working parts plate 82 has a coin carrier recess 88 and communicating therewith a coin insertion chute 89 and a coin discharge passage 90. Communicating with the coin discharge passage are a coin rejection chute 91 and a coin receptacle chute 92. The front plate 83 has a second coin carrier bearing aligned with the bearing in the spacer plate 81, and in addition has an indicator window 93 and a coin view window. A small permanent magnet 95 is mounted in the front plate 83 adjacent the coin discharge passage 90 and opposite the coin retainer recess 86. The device is mounted on a base member 96 which has in it a coin receptacle 97.

A rotatable coin carrier 98 is mounted within the coin carrier recess 88 on a shaft 99 which extends between the coin carrier bearings in the spacer plate 81 and front plate 83. The coin carrier 98 is formed with a coin receiver recess 100 cut from its outer periphery and has an upper stop pin 101 and a lower stop pin 102 secured to its periphery above and below, respectively, the coin receiver 100. An upper stop lip 103 limits the rotation of the coin carrier 98 by stopping the upward movement of the upper stop pin 101. When the stop lip 103 engages the stop pin 101 the coin carrier 98 is in coin receiving position with the coin receiver 100 opposite the coin insertion chute 89. Similarly, a lower stop lip 104 stops the downward rotation of the coin carrier 98 by interrupting the downward rotation of the lower stop pin 102, when the coin receiver 100 is in coin discharge position opposite the coin discharge passage 90. The coin carrier 98 is formed of a non-magnetic material substantially the thickness of a coin and is balanced so that normally, when the coin receiver 100 is empty, the coin carrier 98 is rotated to its coin receiving position (as shown in Fig. 8) and when there is a coin received in the coin receiver 100 the weight of the coin causes the coin carrier 98 to rotate to its coin discharge position (as shown in Fig. 9).

The magnetically operated coin retainer 87 is formed of a sheet of ferro-magnetic material and has a coin retaining lip 105 and a rejected coin guide 106 having substantially the same functions as those of the coin retainer 56 of Fig. 4. The coin retainer 87 is positioned in the coin discharge passage 90 between the permanent magnet 95 and the coin retainer recess 86. Normally (as shown in Fig. 10) the coin retainer 87 is held in its coin retaining position in the coin discharge passage 90 by a small permanent magnet 95. Coins delivered to the coin discharge passage 90 by the coin carrier 98 will be retained in the coin receiver 100 by the coin retaining lip 105 if they are larger in size than the unobstructed portion of the coin discharge passage 90. If the coin is smaller than the unobstructed portion of this passage it will pass by the coin retaining lip 105 onto the rejected coin guide 106 and out of the device through the rejected coin chute 91. To release a coin of acceptable denomination which has been retained in the coin receiver 100 by the coin retaining lip 105, the coin retainer 87 is subjected to magnetic forces opposite to and stronger than those exerted by the permanent magnet 95. When subjected to such external forces of magnetic attraction represented by the horseshoe magnet 107, the coin retainer 87 is drawn into the coin retainer recess 86 (as shown in Fig. 11) leaving the coin discharge passage 90 substantially unobstructed. Coins held in the coin receiver 100 by the coin retaining lip 105 will now fall by the coin retainer 87 and into the coin receptacle 97 via coin receptacle chute 92, and the coin carrier 98, freed from the weight of the coin, will rotate to its coin receiving position.

To insure proper operation of the magnetic coin retaining and rejecting means, the coin retainer 87 should be light in weight and freely movable from the coin discharge passage 90 to the coin retainer recess 86. To keep its weight at a minimum the coin retainer 87 is advantageously in the form of a shallow cup having a flat bottom 108 and perpendicular side walls 109 of light gauge sheet iron. The height of the walls 109 should be very slightly greater than the thickness of the working parts plate 82 so that when the coin retainer 87 is held by the magnet 95 in its coin retaining position in the coin discharge passage 90, the rearward edge of the coin retainer 87 will extend slightly into the coin retainer recess 86. The coin retainer 87 will thereby be held in position opposite the recess 86 so that when external forces of magnetic attraction tend to draw the coin retainer 87 into the coin retainer recess 86 said retainer will be guided into said recess by the overlap of said retainer and said recess.

A coin alignment wedge 110 may be secured to the spacer plate 81 and positioned in the coin discharge passage 90 adjacent the coin carrier recess 88. The purpose of this wedge is to align coins delivered to the coin discharge passage 90 with said passage and to prevent coins from clogging or sticking in the passage by preventing them from falling or tilting sideways in the discharge passage 90.

The rotational position of the coin carrier 98 is visually indicated by means of a distinctive mark 111 (say a white color) on the front surface of the coin carrier 98. The mark 111 may be viewed through the indicator window 93 when the coin carrier 98 is in its coin discharge position. Another distinctive mark (say a red color) appears at the indicator window 93 when the coin carrier 98 is in its coin receiving position.

This embodiment of my invention operates in substantially the same manner as the one first described. Coins inserted into the coin insertion chute 89 are delivered by the rotatable coin carrier 98 to the coin discharge passage 90. If the coin is too small it will pass by the coin retaining lip 105 of the coin retainer 87 and out of the device through coin rejection chute 91. The coin carrier 98 will then return to its coin receiving position. If the coin is of the correct denomination it will be held in the coin receiver 100 by the coin retaining lip 105. The coin carrier 98 will be held in its coin discharge position by the coin and the device will visually indicate this fact. Coins of the correct denomination will be held in the coin receiver 100 until the device is magnetically reset by a patrolman or parking lot attendant at the end of the time for which the fee was paid. To reset the device the officer merely holds his large magnet 107 against the back plate 80 of the device long enough to allow the coin to fall into the coin receptacle 97. He then removes his magnet 107 to permit the coin retainer 87 to return to its coin retaining position in the coin discharge chute 90.

Foremost among the advantages of my device are its economical construction, its easy operation, and its theft and tamper-proof design. In addition, further advantageous features will be apparent to those familiar with the art and possible changes and modifications will suggest themselves, but it should be understood that I do not intend to have the scope of my invention limited except to the extent set forth in the appended claims.

I claim:

1. A coin operated device comprising a casing having a coin receiving chute and a coin discharge chute, and means within the casing disposed between the coin receiving chute and the coin discharge chute for retaining coins of any chosen size and for rejecting coins of smaller sizes comprising a movable coin carrier having a coin receiving recess therein, means normally maintaining said coin carrier recess in coin receiving registry with said coin receiving chute, said coin carrier being movable by the weight of a coin in said recess to a coin discharge position in registry with said coin discharge chute, means normally obstructing the transfer of a coin of chosen size from said recess into said discharge chute while permitting such transfer of smaller coins, said obstructing means including a coin-retaining lip on which a coin of the chosen size is trapped and held partially in said recess to maintain said coin carrier out of coin-receiving registry with said coin-receiving chute, a coin rejection chute communicating with said discharge chute, means visually indicating the trapping of coins of said chosen size on said coin-retaining lip, and a deflecting surface normally disposed in said discharge chute in position to deflect said smaller coins into the coin rejection chute.

2. A coin operated indicating device comprising an outer casing having an inspection window therein, a rotatable coin carrier mounted within said casing, said coin carrier having a coin receiving recess formed in its peripheral edge and visual indicia located for registry with said window, counterweight means normally urging the coin carrier to a coin receiving position in which said indicia is out of registry with said window, the coin carrier being adapted to rotate under the weight of a coin in said recess to a coin discharge position, a coin discharge chute in registry with said recess when the carrier is in its discharge position and when said indicia is in registry with said window, a rejection chute communicating with said discharge chute, coin retaining means restricting the aperture of said discharge chute just sufficiently to prevent entry therein from said recess of a coin of chosen size but permitting the passage therethrough of smaller coins, said coin-retaining means including a coin-retaining lip on which coins of said chosen size are trapped and held partially in said recess to maintain said indicia in registry with said window, deflecting means positioned in said discharge chute in position to deflect such smaller coins into said rejection chute, and means for withdrawing said retaining and deflecting means from said discharge chute, whereby a coin of said chosen size may pass from said recess through said discharge chute.

3. A parking meter comprising a casing provided with an inspection window, a coin receiving chute in its upper portion, and a coin discharge chute in its lower portion, a rotatable coin carrier having therein a peripheral coin receiving circular recess signaling means on said carrier for registry with said window, said carrier being movable under the weight of a coin in said recess from a position in which said recess is in registry with the coin receiving chute to a position in which said recess is in registry with the coin discharge chute and said signaling means is in registry with said window, coin retaining means limiting the aperture of said coin discharge chute to a size just too small to permit passage therethrough of a coin of chosen size but permitting the passage therethrough of smaller coins, said coin-retaining means including a coin-retaining lip on which coins of said chosen size are trapped and held partially in said recess to maintain said signaling means in registry with said window, a coin rejection chute, and deflecting means in position to deflect said smaller coins passing by the coin retaining means into said rejection chute.

4. A parking meter comprising a casing provided with an inspection window, a coin receiving chute in its upper portion and a coin discharge chute in its lower portion, a movable coin carrier having therein a coin receiving recess, signaling means on said carrier for registry with said window, said carrier being movable under the weight of a coin in said recess from a position in which said recess is in registry with the coin receiving chute to a position in which said recess is in registry with the coin discharge chute and said signaling means is in registry in a first condition in said window, a coin rejection chute communicating with said coin discharge chute, a coin receptacle beneath said discharge chute, a coin retaining member having a coin retaining lip limiting the aperture of said coin discharge chute to a size just too small to permit passage therethrough of a coin of chosen size but permitting passage therethrough of smaller coins and further having a deflecting surface normally held in position to deflect said smaller coins into said rejection chute, said coin-retaining member being adapted to maintain said signaling means registrable with said window in said first condition by trapping coins of said chosen size between said recess and said member, and means for moving said coin retaining means to a position in which said lip and said deflecting surface are ineffective for preventing a coin of the chosen size from dropping through said discharge chute into the coin receptacle.

5. A parking meter comprising a casing provided with an inspection window, a coin receiving chute in its upper portion and a coin discharge chute in its lower portion, a movable coin carrier having therein a coin receiving recess, signaling means on said carrier for registry with said window, said carrier being movable under the weight of a coin in said recess from a position in which said recess is in registry with the coin receiving chute to a position in which said recess is in registry with the coin discharge chute and said signaling means is in registry with said window in a first condition, a coin rejection chute communicating with said coin discharge chute, a coin receptacle beneath said discharge chute, coin retaining and rejecting means comprising a member pivotally mounted in said discharge chute and having thereon a coin retaining lip and a coin deflecting surface, means normally holding said member in a position in which said lip limits the aperture of the discharge chute to a size just too small to permit passage therethrough of a coin of chosen size but large enough to permit the passage therethrough of smaller coins, and in which such smaller coins as pass said lip are deflected into said rejection chute, said member retaining said signaling means in registry with said window in said first condition by trapping coins of said chosen size partially between said recess and said member, and means for swinging said member on its pivotal mounting to a position in which said lip and said deflecting surface are ineffective for preventing a coin of the chosen size from dropping through the discharge chute into the coin receptacle.

6. A parking meter comprising a casing provided with an inspection window, a coin receiving chute in its upper portion and a coin discharge chute in its lower portion, a movable coin carrier having therein a coin receiving recess, signaling indicia on said carrier for registration with said window, said carrier being movable under the weight of a coin in said recess from a position in which said recess is in registry with the coin receiving chute to a position in which said recess is in registry with the coin discharge chute and said indicia is in registry in a first condition with said window, a coin rejection chute communicating with said coin discharge chute, a coin receptacle beneath said discharge chute, coin retaining and rejecting means comprising a member pivotally mounted in said discharge chute and having thereon a coin retaining lip and and a coin deflecting surface, a plunger engaging said member and movable between retracted and extended limits, said plunger when moved to its extended limit serving to hold said member in a position in which said lip limits the aperture of the discharge chute to a size just too small to permit passage therethrough of a coin of chosen size but large enough to permit the passage therethrough of smaller coins, and in which such smaller coins as pass said lip are deflected into said rejection chute, said member maintaining said indicia in registry with said window in said first condition by partially trapping coins of said chosen size between said lip in said coin discharge chute and said recess, and a lock normally holding said plunger at its extended limit, said lock when released enabling the plunger to move to its retracted position thereby permitting said member to swing on its pivotal mounting to a position in which said lip and said deflecting surface are ineffective for preventing a coin of the chosen size from dropping through the discharge chute into the coin receptacle.

7. A parking meter comprising a casing provided with an inspection window, a coin receiving chute in its upper portion and a coin discharge chute in its lower portion, a movable coin carrier having therein a coin receiving recess, signaling means on said carrier for registration with said window, said carrier being movable under the weight of a coin in said recess from a position in which said recess is in registry with the coin receiving chute to a position in which said recess is in registry with the coin discharge chute and said signalling means is in registry in a first condition in said window, a coin rejection chute communicating with said coin discharge chute, a coin receptacle beneath said discharge chute, coin retaining and rejecting means comprising a member of ferromagnetic material having a coin retaining lip and a coin deflecting surface, means normally holding said member in a position in which said lip limits the aperture of the discharge chute to a size just too small to permit passage therethrough of a coin of chosen size but large enough to permit the passage therethrough of smaller coins, and in which such smaller coins as pass said lip are deflected into said rejection chute, said member retaining said signaling means in said first condition of registry by trapping coins of said chosen size in said discharge chute partially between said member and said recess, said ferromagnetic member being movable under the influence of a strong magnetic force to a position in which said lip and said deflecting surface are ineffective for preventing a coin of the chosen size from dropping through the discharge chute into the coin receptacle.

8. In apparatus of the character described including an inspection window, a coin receiving chute, a coin discharge chute, a coin carrier for transferring a coin deposited in the receiving chute to the entrance to the discharge chute, and signaling means on said carrier for registration with said window, the improvement which comprises a movable coin retainer normally in the coin discharge chute partially obstructing said discharge chute to prevent passage therethrough of coins of a chosen size but permitting the passage therethrough of smaller coins, said retainer being operable through interengagement with a coin of said chosen size to maintain said coin carrier in position for said signaling means to register with said window, a coin rejection chute branching from the coin discharge chute, deflecting means in the coin discharge chute opposite the coin rejection chute adapted to deflect said smaller coins passing by the coin retainer into said rejection chute, and means for moving said coin retainer to a position in which the coin discharge passage is substantially unobstructed to permit a coin of the chosen size to pass through said discharge passage and thereby to release said coin carrier from the position in which said signaling means registers with said window.

9. In an apparatus of the character described including an inspection window, a coin receiving chute, a coin discharge chute, a coin carrier for transferring a coin deposited in the receiving chute to the entrance to the discharge chute, and signaling means on said carrier for registration with said window, the improvement which comprises a coin rejection chute branching from the coin discharge chute, a movable coin retaining means including a coin retaining lip normally limiting the aperture of said coin discharge chute to a size too small to permit passage therethrough of a coin of chosen size but permitting passage therethrough of smaller coins and further including a deflecting surface normally held in position to deflect said smaller coins into said rejection chute, said coin retaining means being operable through interengagement with coins of said chosen size to maintain said coin carrier in position for said signaling means to register with said window, and a screw mechanism for moving said coin retaining means from a position limiting the aperture of said coin discharge chute to a position in which said lip and said deflecting surface are ineffective for preventing a coin of the chosen size from dropping through said discharge chute and thereby releasing said coin carrier from the position in which said signaling means is maintained in registry with said window, said screw mechanism comprising a lock adapted to travel in a helical path when rotated by a key and a plunger linking said lock to said coin retaining means.

10. In apparatus of the character described including an inspection window, a coin receiving chute, a coin discharge chute, means for transferring a coin deposited in the receiving chute to the entrance to the discharge chute, and signaling means on said coin transferring means for registration with said window, a movable ferromagnetic coin retainer normally held in the coin discharge chute and limiting the aperture thereof so as to prevent passage therethrough of coins of a chosen size but permitting passage therethrough of smaller coins, said coin retainer being operable through interengagement with a coin of said chosen size to maintain said coin transferring means in position for said signaling means to register with said window, a coin rejection chute branching from the coin discharge chute, and deflecting means adapted to deflect said smaller coins passing by the coin retainer into said rejection chute, said ferromagnetic coin retainer being movable under the influence of a strong magnetic force to a position in which said coin retainer is ineffective to prevent a coin of the chosen size from dropping through said discharge chute and thereby to release said coin transferring means from the position in which said signaling means is in registry with said window.

References Cited in the file of this patent

UNITED STATES PATENTS

| Number | Name | Date |
|---|---|---|
| 529,655 | Lamplough | Nov. 20, 1894 |
| 812,651 | Hartley | Feb. 13, 1906 |
| 888,562 | Wigzell | May 26, 1908 |
| 1,228,674 | Hughes | June 5, 1917 |
| 1,630,427 | Hedley | May 31, 1927 |
| 2,064,686 | Pierce | Dec. 15, 1936 |